United States Patent [19]

Iyama et al.

[11] Patent Number: 5,197,057
[45] Date of Patent: Mar. 23, 1993

[54] DISC CHANGER WITH DUST COVER

[75] Inventors: Yasukata Iyama, Osaka; Shuji Sakamoto, Ikoma; Masahiko Kajitani, Osaka; Soichi Kimura, Osaka; Tadashi Yoshikawa, Osaka, all of Japan

[73] Assignee: Matsushita Electric Industrial Co., Ltd., Osaka, Japan

[21] Appl. No.: 488,894

[22] Filed: Mar. 6, 1990

[30] Foreign Application Priority Data

Mar. 7, 1989 [JP] Japan .................................... 1-54034
Mar. 20, 1989 [JP] Japan .................................... 1-68201

[51] Int. Cl.$^5$ ...................... G11B 17/22; G11B 33/02; G11B 17/04; G11B 17/08
[52] U.S. Cl. ..................................... 369/37; 369/75.1; 369/178
[58] Field of Search ................. 369/176, 178, 197, 36, 369/37, 38, 39, 75.1; 108/139; 248/349

[56] References Cited

U.S. PATENT DOCUMENTS

| | | | |
|---|---|---|---|
| 4,486,875 | 12/1984 | Kelleher | 369/170 |
| 4,670,860 | 6/1987 | Hasegawa et al. | 369/39 |
| 4,701,901 | 10/1987 | Imai | 369/75.2 |
| 4,811,314 | 3/1989 | Alves | 369/75.1 |
| 4,831,612 | 5/1989 | Kurihara et al. | 369/256 X |
| 4,901,172 | 2/1990 | Nakazawa et al. | 369/37 |

OTHER PUBLICATIONS

Technics SLPC 705BLK advertisement.
Citizan "CBM 777", Stereo Review, p. 22, Jun. 1988.

Primary Examiner—Eugene R. LaRoche
Assistant Examiner—Michael C. Kessell
Attorney, Agent, or Firm—Pollock, VandeSande & Priddy

[57] ABSTRACT

A disc changer for sequentially playing back a plurality of discs such as compact discs has a circular tray rotatably mounted on a base for supporting a plurality of discs replacably mounted on a horizontal surface. A drive mechanism rotates the tray and stops the tray to position one of the discs in a playback position. A recorded signal is reproduced from the disc in the playback position by a pickup. The pickup is vertically moved and stopped in a predetermined vertical position by a lifting/lowering mechanism. A pickup cover is disposed over the tray in covering relation to the pickup and the disc in the playback position. The disc changer also has a dust cover hinged to the base, for covering at least the tray, the dust cover having a transparent window extending over the tray.

6 Claims, 8 Drawing Sheets

DISC CHANGER WITH DUST COVER

BACKGROUND OF THE INVENTION

The present invention relates to a disc changer for playing a plurality of discs in a sequence.

Some modern disc playback devices such as compact disc players incorporate disc changers for automatically playing a plurality of discs in a sequence. One known disc changer will be described below with reference to FIGS. 8 and 9 of the accompanying drawings.

Figure 8:
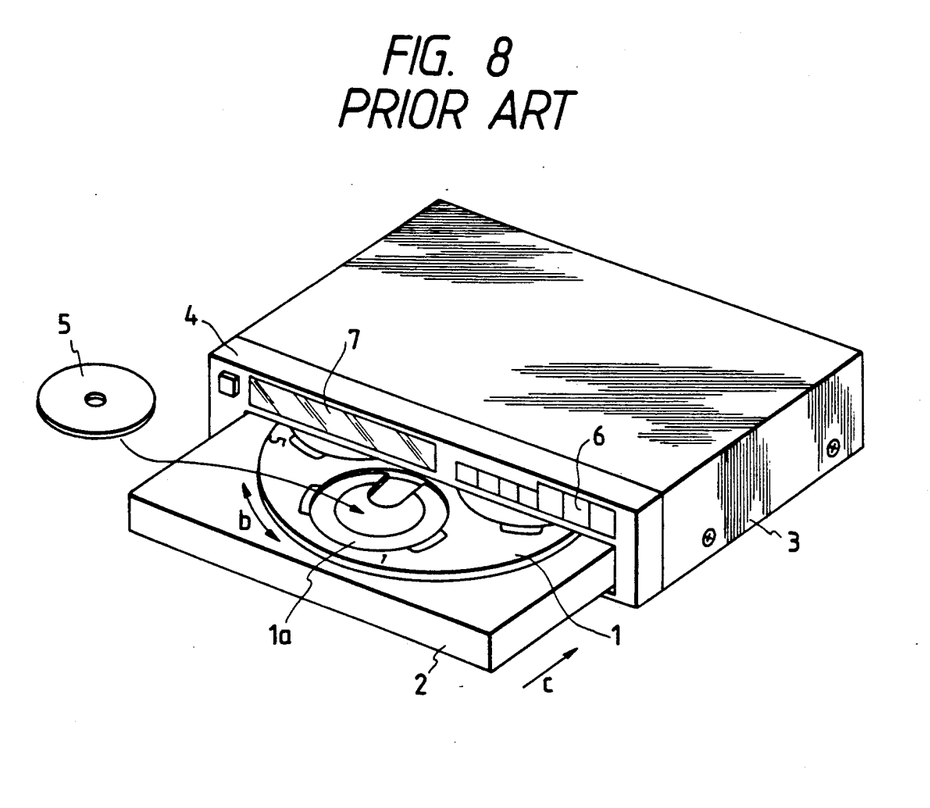
FIG. 8 is a perspective view of a conventional disc changer with a base projecting out of a housing.

As shown in FIG. 8, a disc changer includes a circular tray 1 mounted on a base 2 for rotation in the directions indicated by the arrow b. The base 2 is slidably disposed in a housing 3, and can be moved into the housing 3 in the direction indicated by the arrow c. In FIG. 8, the base 2 is shown as being moved out of the housing 3. With the base 2 thus projecting from the housing 3, a plurality of discs 5 such as compact discs can be placed in respective disc recesses 1a defined in the upper surface of the tray 1. The housing 3 has a front panel 4 which supports control buttons 6 and a display unit 7.

Figure 9:
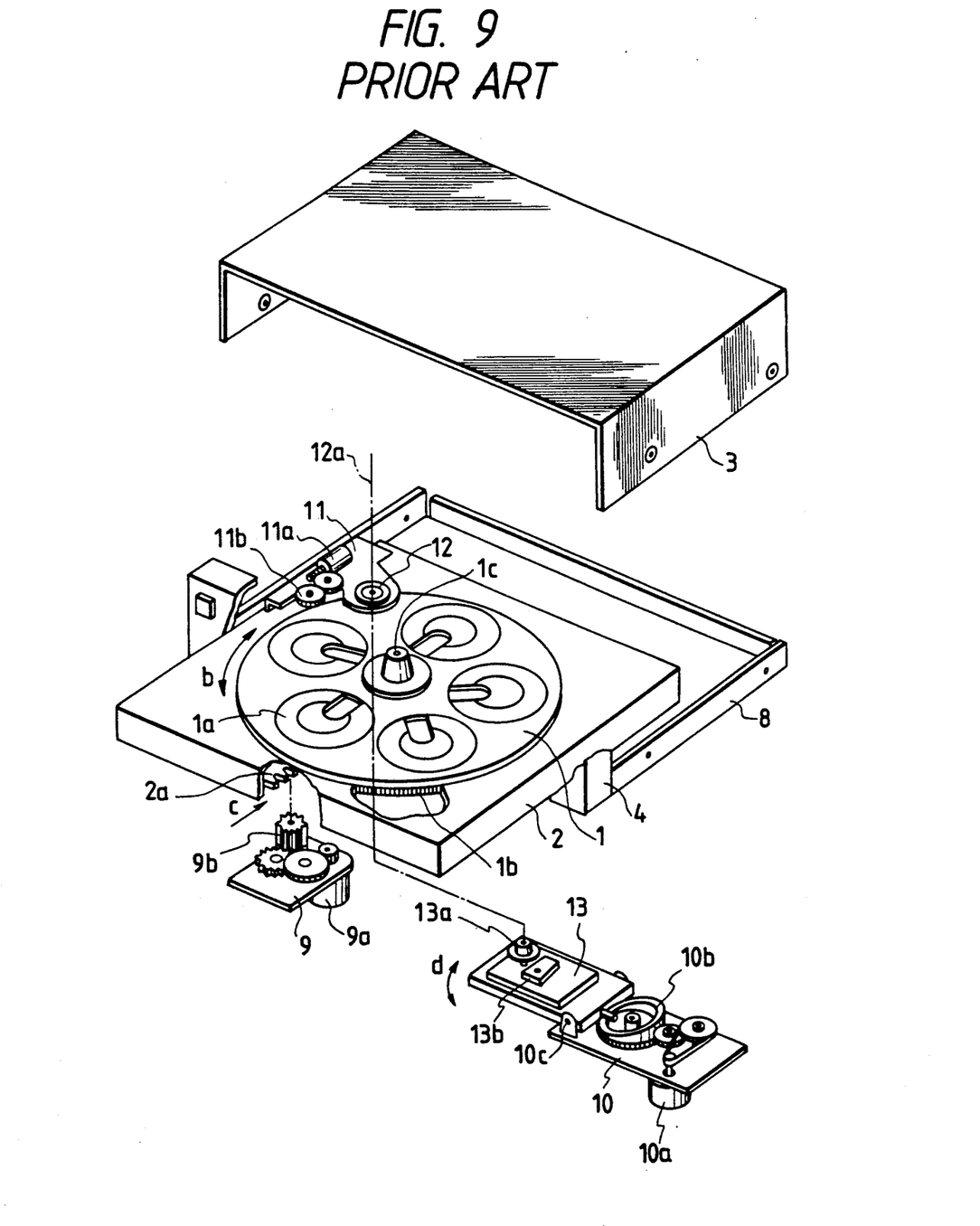
FIG. 9 is an exploded perspective view of the disc changer shown in FIG. 8.

FIG. 9 shows a drive system incorporated in the disc changer. A base sliding mechanism 9 is fixedly mounted on a chassis 8 which is fixedly mounted in the housing 3. The base sliding mechanism 9 has a drive motor 9a and a speed reducer gear train including a gear 9b which meshes with a rack 2a fixed to the lower surface of the base 2. When the drive motor 9a is energized, the gear 9b is rotated through the speed reducer gear train to move the base 2 in the direction indicated by the arrow c. A pickup lifting/lowering mechanism 10 is fixed to the lower surface of the base 2. The pickup lifting/lowering mechanism 10 includes a drive motor 10a, a lifting/lowering cam 10b, and a pickup 13 which includes a turntable 13a and an optical system 13b. Rotation produced by the drive motor 10a is converted into vertical movement by the lifting/lowering cam 10b to lift or lower the pickup 13 about a shaft 10c in one of the directions indicated by the arrows d. While a disc is being played back, the pickup 13 is held in an upper position. While the tray 1 is rotating about its shaft 1c, the pickup 13 is held in a lower position. A tray rotating mechanism 11 is mounted on the upper surface of the base 2. The tray rotating mechanism 11 comprises a drive motor 11a and a gear train including a gear 11b held in mesh with an external gear 1b on and around the outer circumference of the tray 1. When the drive motor 11a is energized, the tray 1 is rotated about the shaft 1c in the direction indicated by the arrow b. When a desired one of the discs 5 has reached a playback position 12a, the drive motor 11a is de-energized to stop the tray 1.

The conventional disc changer thus constructed operates as follows:

With the base 2 projecting out of the housing 3, a plurality of discs 5 are mounted respectively in the disc recesses 1a of the tray 1. One of the control buttons 6 is pushed to produce a command for sliding movement of the base 2. The drive motor 9a is energized to cause the gear 9b and the rack 2a to move the base 2 back into the housing 3 until the front face of the base 2 lies flush with the front face of the front panel 4. Then, the drive motor 11a is energized to enable the gear 11b and the gear 1b to rotate the tray 1 about the shaft 1c until the center of the disc recess 1a in which a selected one of the discs 5 is mounted is brought into alignment with the playback position 12a, whereupon the drive motor 11a is de-energized. The pickup 13 is lifted by the pickup lifting/lowering mechanism 10, and the turntable 13a and a magnet clamp 12 jointly clamp the selected disc 5 therebetween.

The disc 5 is then rotated about its own axis by the turntable 13a, and the optical system 13b, while under focusing and tracking control, reproduces a recorded signal from the disc 5.

While the disc 5 is being played back, the tray 1 is positioned in the housing 3. Therefore, it is impossible to change the other discs during the disc playback. As long as the tray 1 is positioned inside the housing 3, it is impossible to confirm the labels of the discs 5 irrespective of whether a disc 5 is being played or not. For confirming the discs 5, it is necessary to withdraw the tray 1 out of the housing 3 and rotate the tray 1 to move the discs 5 successively into an outer exposed position where the user can recognize the information printed on the labels of the discs 5. When the discs are to be mounted on and removed from the tray 1, the tray 1 has to be ejected from the housing 3 and rotated so that the discs can be loaded or unloaded one by one.

SUMMARY OF THE INVENTION

In view of the aforesaid problems of the conventional disc changer, it is an object of the present invention to provide a disc changer which allows the user to replace other discs freely while one disc is being played back, which permits the user to directly confirm, from above, the labels of the discs on a tray irrespective of whether a dust cover is opened or closed, and which also allows the user to load or unload discs simply by opening and closing a dust cover.

According to the present invention, there is provided a disc changer comprising a base, a tray rotatably mounted on the base, for supporting a plurality of discs replaceably on a horizontal surface, a drive mechanism for rotating the tray and stopping the tray to position one of the discs in a playback position, a pickup for reproducing a recorded signal from the disc in the playback position, a lifting/lowering mechanism for vertically moving the pickup and stopping the pickup in a predetermined vertical position in signal reproducing relation to the disc in the playback position, and a pickup cover disposed over the tray and covering the pickup and the disc in the playback position.

The disc changer also has a dust cover angularly movably supported on the base, for covering at least the tray. The dust cover has a transparent window extending over the tray.

Since only the pickup is covered with the pickup cover, the discs other than the disc which is being played in the playback position can freely and easily be unloaded and replaced with other discs when the dust cover is open. The information printed on the labels of the discs on the tray can be visually confirmed through the transparent window.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
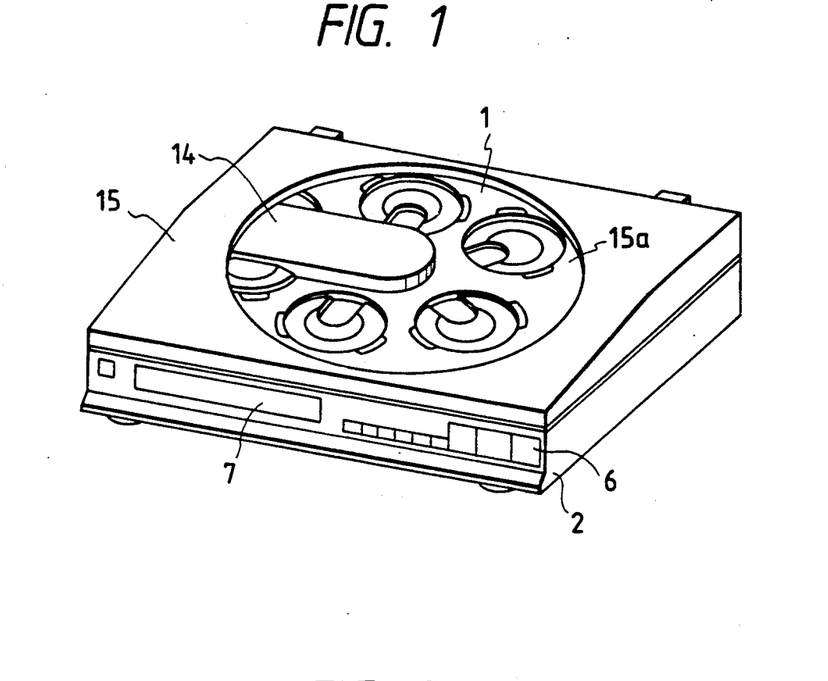
FIG. 1 is a perspective view of a disc changer according to the present invention, with a dust cover closed.
Figure 2:
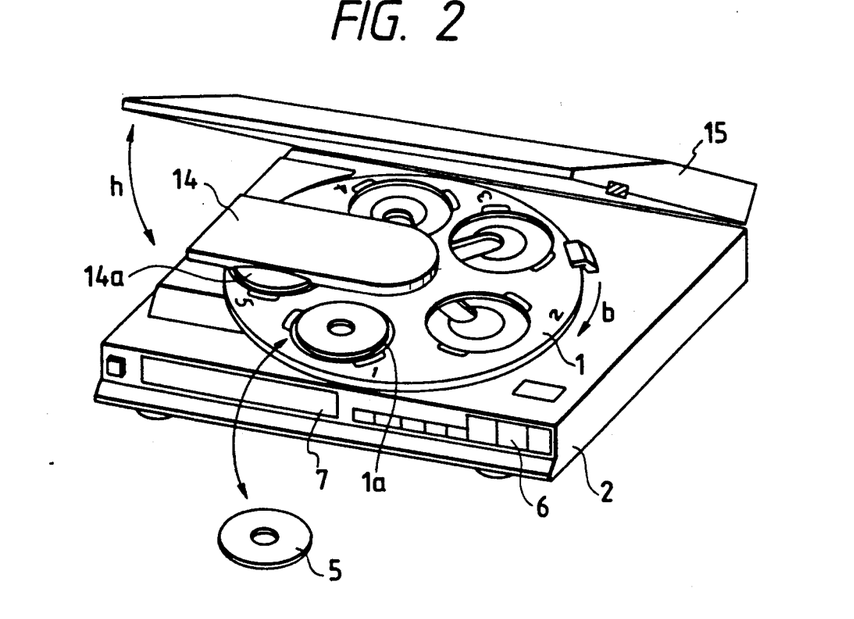
FIG. 2 is a perspective view of the disc changer shown in FIG. 1, with the dust cover opened.

FIGS. 1 and 2 show a disc changer according to the present invention, which is incorporated in a disc playback apparatus such as a compact disc player.

The disc changer comprises a circular tray 1 rotatably mounted on a base 2. The tray 1 has a plurality of disc recesses 1a defined in its upper horizontal surface for receiving and supporting respective discs 5. The disc recesses 1a are numbered "1" through "5", for example. The base 2 has a front panel on which there are control buttons 6 and a display unit 7. A pickup cover 14 is mounted on the base 2 in overhanging relation to the tray 1. A dust cover 15 is openably and closably hinged to the base 2. When the dust cover 15 is closed, it covers the tray 1 and the pickup cover 14. The dust cover 15 has a circular transparent window 15a which is position over the tray 1 when the dust cover 15 is closed. In FIG. 2, the dust cover 15 is shown as being open for loading and unloading discs 5.

Figure 3:
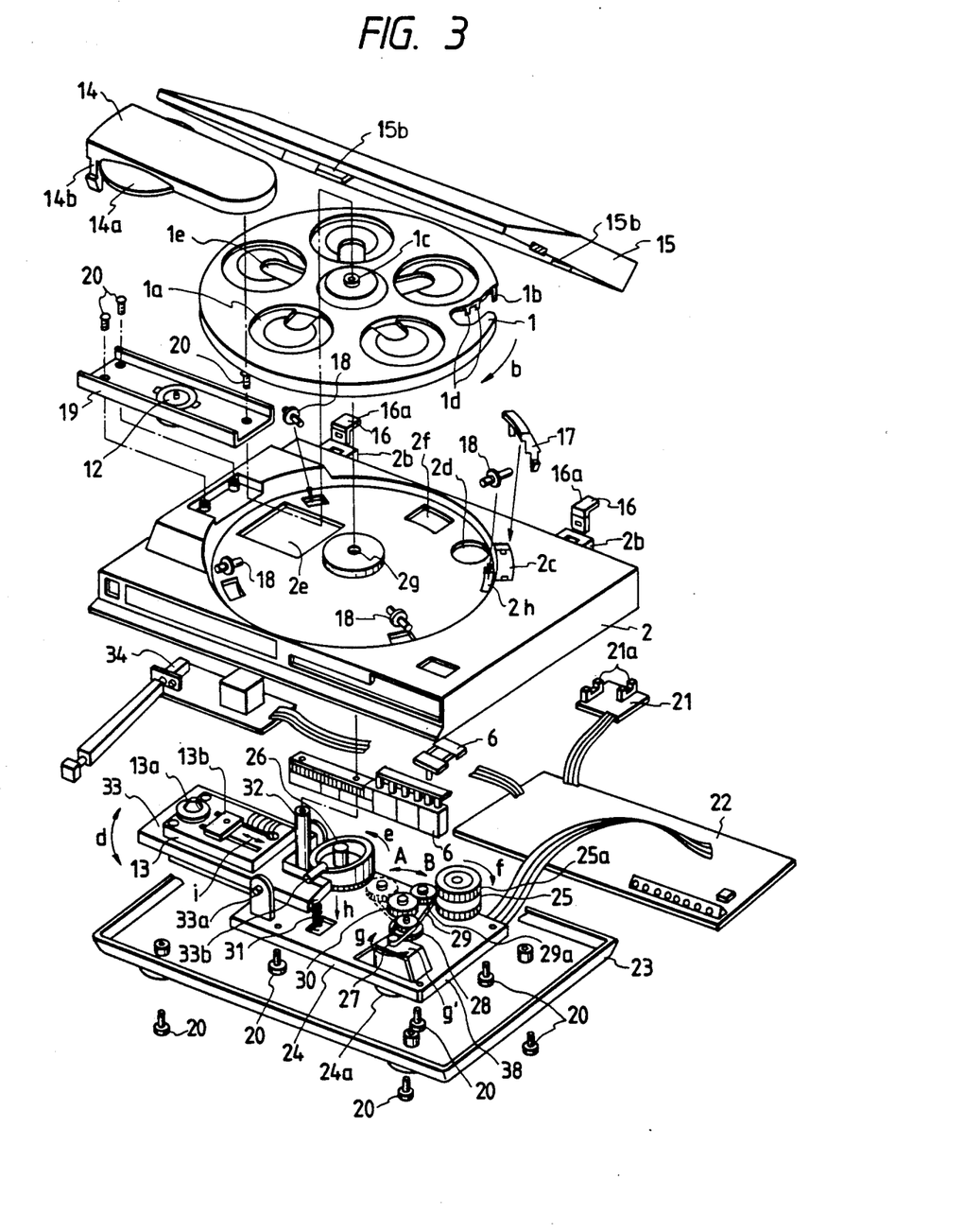
FIG. 3 is an exploded perspective view of the disc changer.

As shown in FIG. 3, an electronic circuit board 22, a drive mechanism 24, a power supply unit 34, and the control buttons 6 are fastened to the lower surface of the base 2 by means of screws 20. The drive mechanism 24, the power supply unit 34, and the control buttons 6 are electrically connected to the electronic circuit board 22. A bottom plate 23 is also fastened to the base 2 by screws 20 in covering relation to the electronic circuit board 22, the drive mechanism 24, the power supply unit 34, and the control buttons 6.

The base 2 has two hinge attachments 2b on its rear edge, and two hinges 16 are inserted respectively into the hinge attachments 2b. The hinges 16 have tip ends 16a inserted respectively in two hinge attachments 15b on the rear edge of the dust cover 15. Therefore, the dust cover 15 can be opened and closed with respect to the base 2 about pivot pins of the hinge 16 in the directions indicated by the arrow h (FIG. 2). According to the invention, the dust cover 15 is manually opened and closed.

Four angularly spaced rollers 18 are rotatably supported in respective attachment holes 2h defined in the base 2. The drive mechanism 24 has a tray shaft 32 projecting through a central hole 2g defined in the base 2, the tray shaft 32 having an internally threaded hole defined therein. The tray shaft 32 which extends through the central hole 2g is inserted through a central hole 1c defined in the tray 1, with the tray 1 rotatably supported on the rollers 18. Over the tray 1, there is a clamp plate 19 fixed to the base 2 and the tray shaft 32 by screws 20. A tray holder 17 is inserted, from above, into an attachment hole 2c defined in the base 2, and secured to the base 2 by prongs, thereby holding the tray 1 against upward displacement. A magnet clamp 12 is supported on the clamp plate 19 and is slightly movable in vertical and horizontal directions. The pickup cover 14 is disposed on and over the clamp plate 19, and fixed to the base 2 by prongs 14b. The pickup cover 14 has an integral disc cover 14a.

The tray 1 has an internal gear 1b held in mesh with an upper gear 25a of a drive gear assembly 25 of the drive mechanism 24 through a hole 2d defined in the base 2. When the drive gear assembly 25 is rotated about its own axis in the direction indicated by the arrow f, the tray 1 is rotated about the tray shaft 32 in the direction indicated by the arrow b. A sensor board 21 with two light sensors 21a mounted thereon is fixed to the base 2 and electrically connected to the electronic circuit board 22. The light sensors 21a project upwardly through an opening 2f defined in the base 2. Shutters 1d which move through the central regions of the light sensors 21a for controlling light beams thereof are attached to the lower surface of the tray 1. Upon rotation of the tray 1, signals are sent from the light sensors 21a to the electronic circuit board 22 for controlling the tray 1 to rotate and stop at a given angular position.

The drive mechanism 24 includes an angularly movable plate 33 which can be angularly lifted and lowered about a shaft 33a in the directions indicated by the arrow d. A pickup 13 is supported on one side of the angularly movable plate 33, the other side of which is normally urged to move in the direction indicated by the arrow h by a spring 31. The other side of the angularly movable plate 33 supports thereon a rod 33b held in contact with an upper circular cam surface 26b (FIG. 4) surface of a lifting/lowering cam 26 which is rotatably mounted on a drive mechanism base 38 by a shaft 40 (FIG. 4) for rotation about its own axis. In response to the rotation of the cam 26 in the direction indicated by the arrow e, the rod 33b causes the angularly movable plate 33 to move angularly about the shaft 33a in the directions indicated by the arrow d. The drive mechanism 24 also has a drive motor 24a whose output shaft 44 (FIG. 4) is operatively coupled through a drive belt 27 to a pulley gear 28 and an intermediate gear 30. The drive motor 24a and the pulley gear 28 are mounted on the drive mechanism base 38. The intermediate gear 30 is mounted by a shaft 42 (FIG. 4) on one end of an arm 29 which is rotatably supported on the drive mechanism base 38 coaxially with the gear 30. The arm 29 is angularly movable in the directions indicated by the arrows A, B. A planet gear 29a is rotatably supported by a shaft 41 on the other end of the arm 29, the planet gear 29a being normally urged upwardly by a friction spring 39 (FIG. 4) by which the planet gear 29a is frictionally coupled to the arm 29. Therefore, when the intermediate gear 30 is rotated by the drive motor 24a, the arm 29 is also rotated about the shaft 42 to turn the planet gear 29a in the direction indicated by the arrow A or B depending on the direction in which the intermediate gear 30 rotates. When the planet gear 29a is turned in the direction indicated by the arrow A, it is brought into mesh with a gear 26a integral with the cam 26. When the planet gear 29a is turned in the direction indicated by the arrow B, it is brought into mesh with the drive gear assembly 25.

Figure 4:
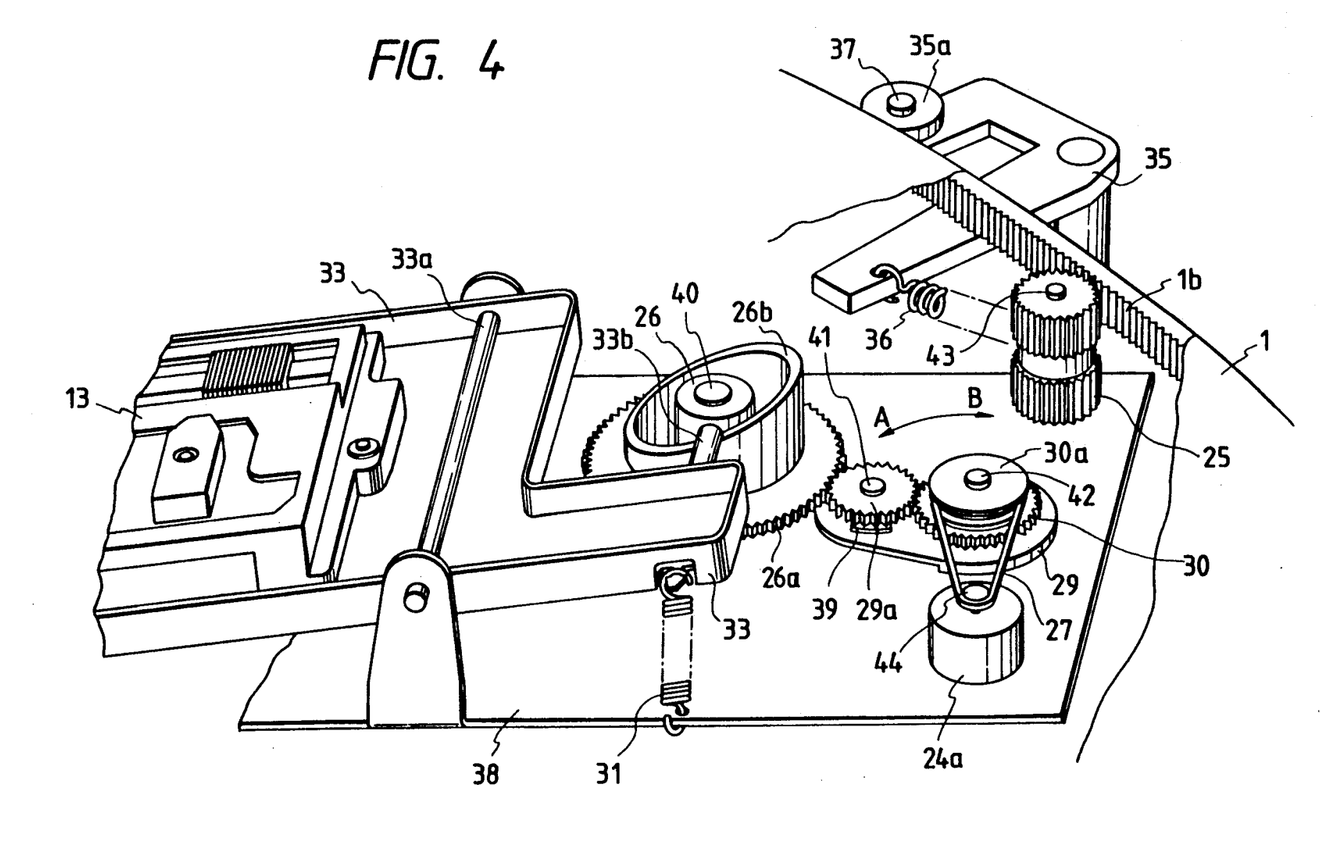
FIG. 4 is an enlarged fragmentary perspective view, partly broken away, of a drive mechanism of the disc changer.
Figure 5:
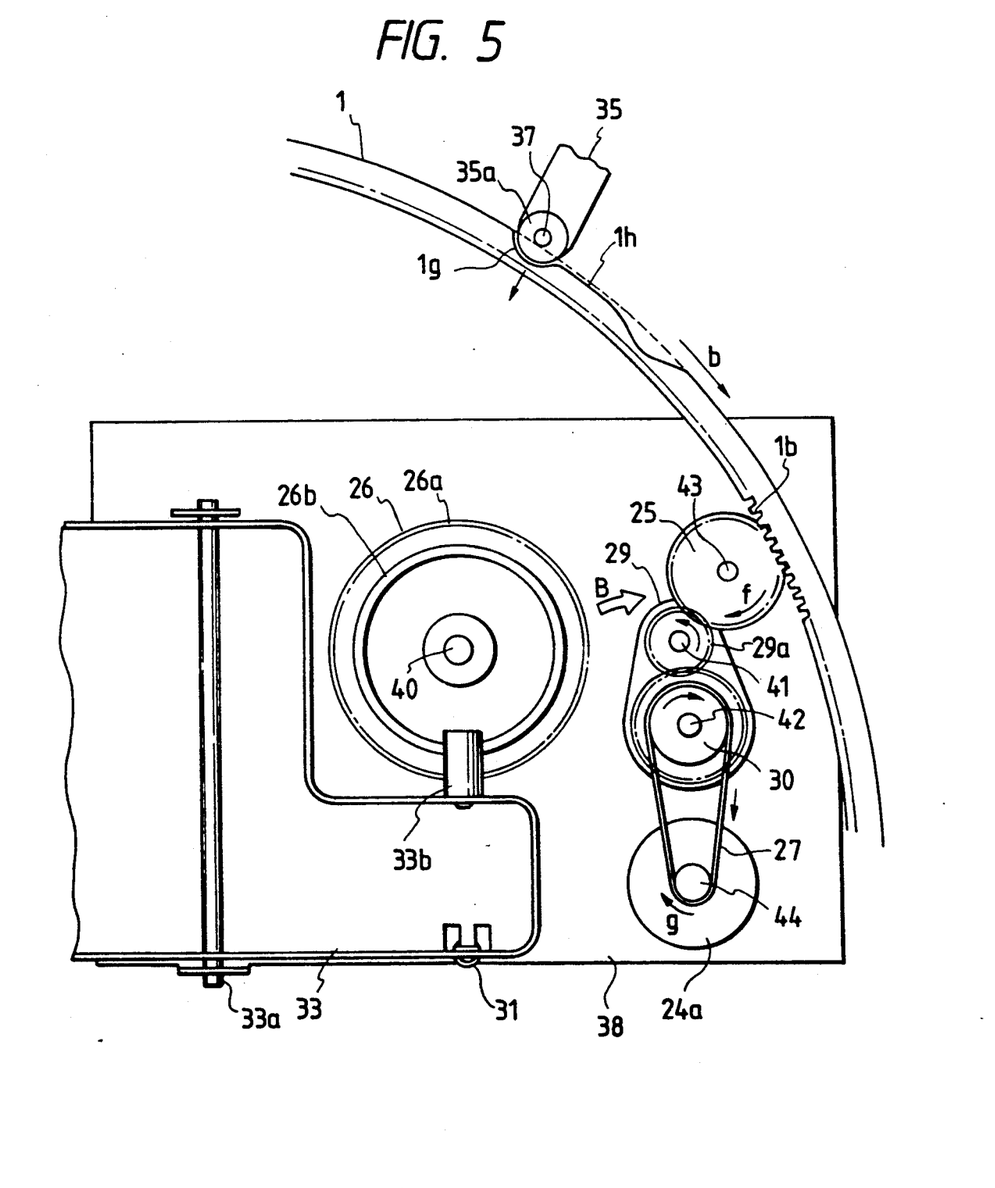
FIGS. 5 and 6 are fragmentary plan views showing the manner in which the drive mechanism operates.
Figure 6:
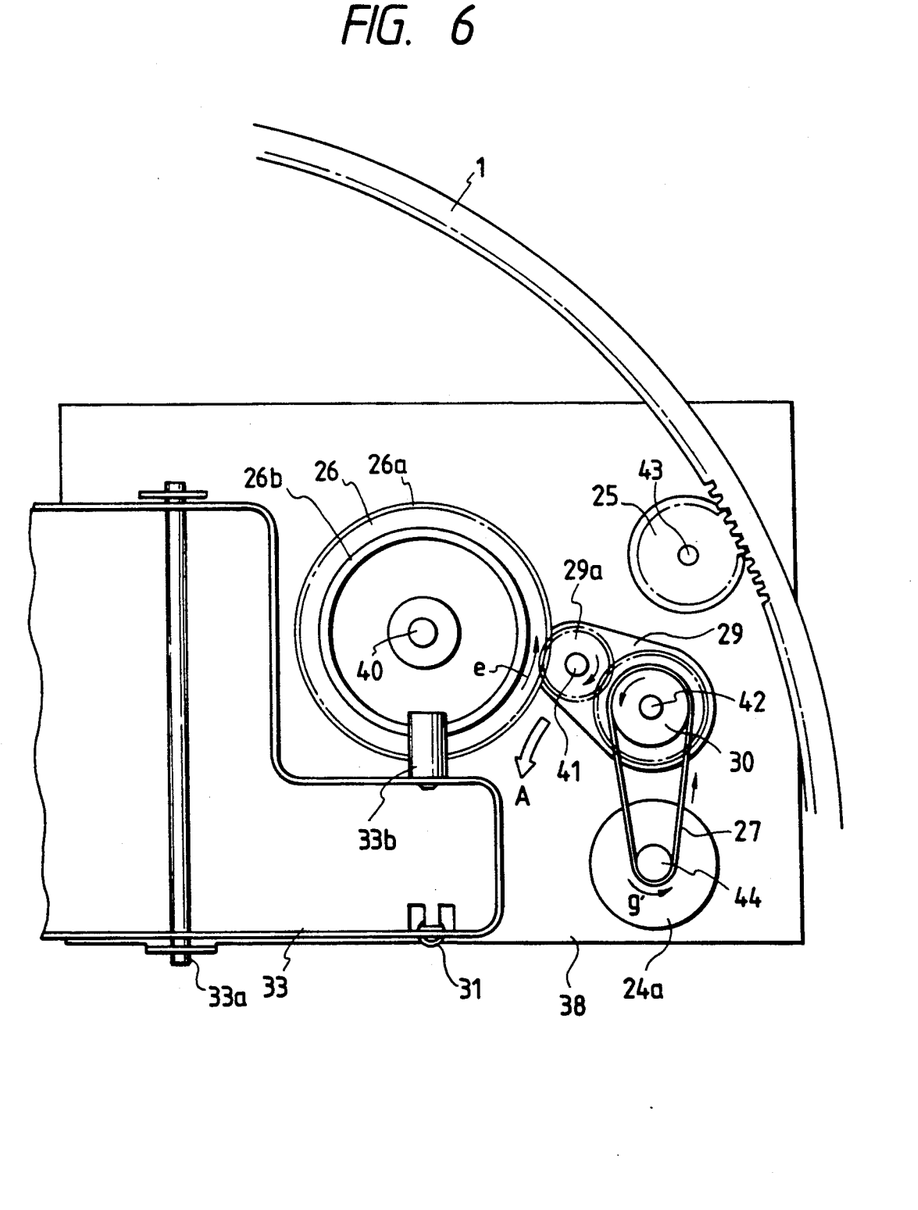

In FIGS. 4, 5, and 6, the pulley gear 28 is not employed, and the drive pulley 27 is directly trained around a pulley 30a coaxially integral with the intermediate gear 30. This arrangement and the gearing shown in FIG. 3 are essentially the same as each other, and may alternatively be employed in the drive mechanism 24.

When the drive motor 24a is energized to rotate the output shaft 44 in the direction indicated by the arrow g (FIG. 5), the planet gear 29a meshes with the drive gear assembly 25 and rotates the drive gear assembly 25 about a shaft 43 by which the drive gear assembly 25 is rotatably mounted on the drive mechanism base 38. Therefore, the tray 1 is rotated in the direction indicated by the arrow b by the drive gear assembly 25. When the drive motor 24a is reversed to rotate the output shaft 44 in the direction indicated by the arrow g' (FIG. 6), the planet gear 29a meshes with the gear 26a of the cam 26 and rotates the cam 26 in the direction indicated by the arrow e. Therefore, the pickup 13 is angularly lifted and lowered about the shaft 33a in the directions indicated by the arrow d (FIG. 3).

The pickup 13 includes a turntable 13a and an optical system 13b which is unitized as an optical block.

Figure 7:
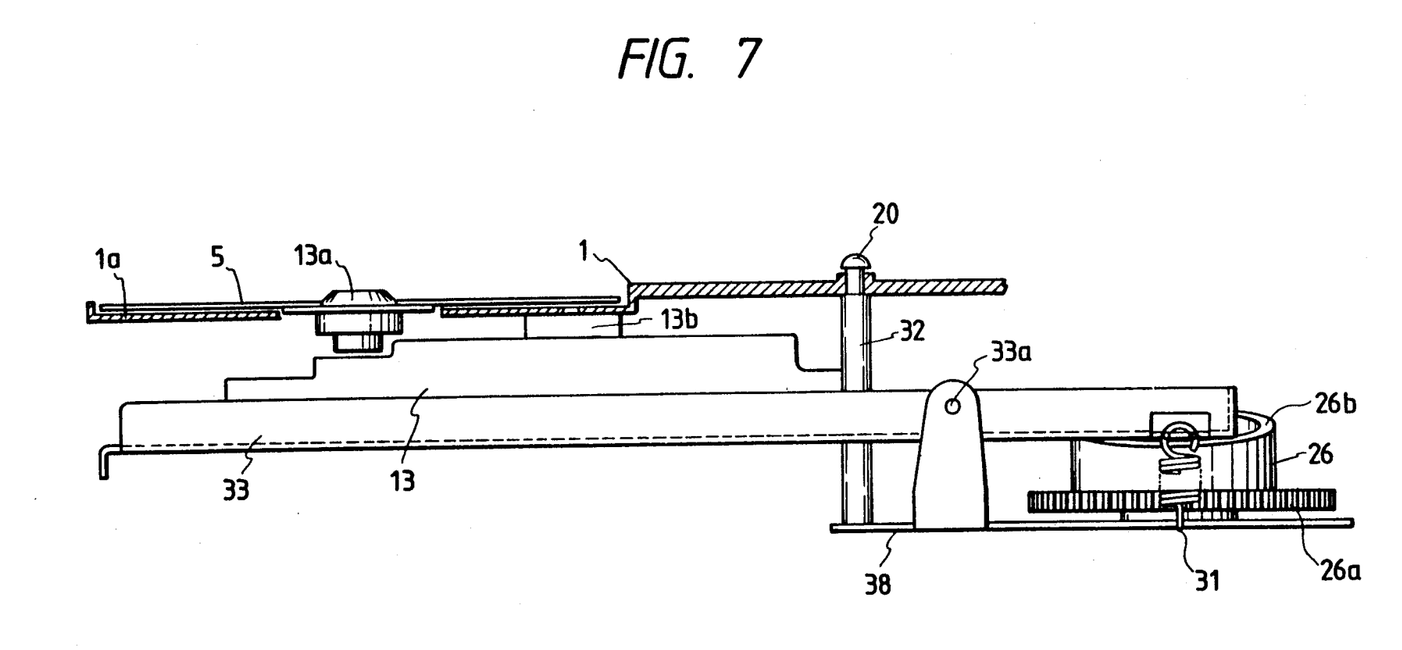
FIG. 7 is a side elevational view of the drive mechanism.

In FIG. 7, the rod 33b on the angularly movable plate 33 contacts the cam surface 26b in its lowest position. A disc 5 is played back when the cam 26 is in this angular position. With the cam 26 stopped in this angular position, the disc 5 supported in the disc recess 1a of the tray 1, which is stopped in a playback position, is lifted by the turntable 13a and then clamped between the turntable 13a and the magnet clamp 12. The disc 5 is now rotated by the turntable 13a, while at the same time a recorded signal is reproduced from the disc 5 by the optical system 13b which operates under focusing and tracking control.

As shown in FIG. 5, the tray 1 has a braking groove 1h and a positioning groove 1g which are defined in the outer circumferential surface thereof. Actually, the tray 1 has five such braking grooves and five such positioning grooves, for example. In FIG. 4, a roller 35a is rotatably supported on a set lever 35 by a shaft 37, the set lever 35 being normally urged by a spring 36 in a direction to urge the roller 35a against the tray 1. After the drive motor 24a is de-energized, the inertial force of the tray 1 is dampened by the roller 35a as it moves in the braking groove 1h, and the desired disc 5 is positioned in the playback position by the roller 35a as it is positioned in the positioning groove 1g.

The tray 1 can also be rotated manually when the planet gear 29a is not held in mesh with the drive gear assembly 25.

Disc playback operation of the disc changer will now be described below.

The dust cover 15 which has been closed as shown in FIG. 1 is manually opened as shown in FIG. 2, and discs 5 are loaded in the respective disc recesses 1a of the tray 1. When one of the control buttons 6 is pushed to start a playback mode, the tray 1 is rotated in the direction indicated by the arrow b until the tray recess 1a which is numbered "1" reaches the playback position concentric with the disc cover 14a of the pickup cover 14. During this time, the pickup 13 is lowered below the tray 1. Then, the pickup 13 is lifted through an opening 2e defined in the base 2 to cause the turntable 13a to project through a turntable hole 1e defined within the tray recess 1a. The disc 5 in the tray recess 1a is now placed on the turntable 13a, and then clamped between the turntable 13a and the magnet clamp 12 on the clamp plate 19.

The turntable 13a is rotated, and the optical system 13b reproduces a recorded signal from the disc 5 while being horizontally moved in one of the directions indicated by the arrow i (FIG. 3). The playback mode is performed irrespective of whether the dust cover 15 is open or closed. While the disc 5 is being played, other discs may be loaded into or unloaded from the tray recesses 1a other than the tray recess 1a beneath the disc cover 14a.

As shown in FIG. 2, the entire upper surface of the tray 1, except the area covered by the disc cover 14a, is fully exposed, and the dust cover 15 is openably and closably hinged to the base 2. Therefore, simply with the dust cover 15 being opened, discs other than the disc below the disc cover 14a can be loaded and unloaded regardless of whether the disc changer is in the playback mode or not. Since the dust cover 15 has the transparent window 15a over the tray 1, the information printed on the labels of the discs 5 on the tray 1, except for the disc 5 below the disc cover 14a, can be visually confirmed through the transparent window 15a, irrespective of whether the dust cover 15 is open or closed. Whether there are discs on the tray 1 or not can also be visually confirmed through the transparent window 15a at any time.

Free disc loading and unloading capability during the playback mode allows discs 5 to be quite easily placed on and removed from the tray 1, and also permits loaded discs, which are not being played, to be successively replaced with other discs to be played. With the latter option, it is possible to play any number of different discs successively without interruption in an endless playback operation, which has not been possible with the existing disc changers.

Even when the dust cover 15 is open, the disc 5 being played is protected by the disc cover 14a and hence the playback mode is not interrupted in error by the user who might otherwise touch the disc 5 being played. The disc cover 14a is also effective to prevent the laser beam of the pickup 13 from leaking out and damaging the eyes of the user.

While the dust cover 15 is hinged to the base 2 in the illustrated embodiment, the disc changer may be placed in an upper portion of an audio rack, and the dust cover may be openably and closably mounted on the audio rack.

Although a certain preferred embodiment has been shown and described, it should be understood that many changes and modifications may be made therein without departing from the scope of the appended claims.

What is claimed is:

1. A disc changer comprising:
   a base;
   a tray rotatably mounted on said base for supporting a plurality of optical discs replaceably mounted on a horizontal surface;
   a drive mechanism for rotating said tray and stopping said tray to position one of the optical discs in a playback position;
   an optical pickup means for reproducing a recorded signal from the optical disc in said playback position;
   a pickup cover mounted on said base and covering completely said optical pickup means and the optical disc in said playback position at all times irrespective of whether the recorded signal is reproduced from the optical disc in said playback position by said optical pickup means;

a clamp means mounted on said base for clamping the optical disc in said playback position;

a lifting/lowering mechanism for vertically moving said optical pickup means and stopping said optical pickup means in a predetermined vertical position in signal reproducing relationship to the optical disc in said playback position; and a dust cover supported on said base and movable to at least an opened and a closed position, said dust cover covering said tray and said pickup cover when it is at its closed position.

2. A disc changer according to claim 1, wherein said dust cover has a transparent window extending over said tray.

3. A disc changer according to claim 1, wherein said dust cover is movably hinged to said base.

4. A disc changer according to claim 3, further comprising positioning means for angularly positioning said tray to locate the disc in said playback position.

5. A disc changer comprising:
a rotatable tray for supporting a plurality of optical discs replaceably mounted on a horizontal surface;
an optical pickup means for optically reproducing a recorded signal from one of the optical discs in a playback position;
a first drive assembly for rotating said tray;
a second drive assembly for vertically moving said optical pickup means;
an actuator means for generating drive power; and
selective transmitting means, engagable selectively with one, at a time, of said first and second drive assemblies, for selectively transmitting the drive power from said actuator means to one, at a time, of said first and second drive assemblies;
wherein said selective transmitting means is also brought into and out of engagement with said first drive assembly to allow said tray to be rotated alternately by the drive power from said actuator means and manually.

6. A disc changer comprising:
a base;
a tray rotatably mounted on said base for supporting a plurality of discs replaceably mounted on a horizontal surface;
a drive mechanism for rotating said tray and stopping said tray to position one of the discs in a playback position;
a pickup means for reproducing a recorded signal from the disc in said playback position;
a pickup cover covering said pickup means and the disc in said playback position;
a clamp means mounted on said base for clamping the disc in said playback position;
a lifting/lowering mechanism for vertically moving said pickup means and stopping said pickup means in a predetermined vertical position in signal reproducing relationship to the disc in said playback position; and
a dust cover movably hinged to said base and movable to at least an opened and a closed position, said dust cover covering said tray and said pickup cover when it is at its closed position; and
positioning means for angularly positioning said tray to locate the disc in said playback position;
wherein said positioning means comprises a groove defined in an outer circumferential surface of said tray, a lever supporting a roller, and a spring for normally urging said level to push said roller into said groove.

* * * * *